United States Patent [19]

Sorokes

[11] Patent Number: 5,152,070
[45] Date of Patent: Oct. 6, 1992

[54] POSITION VALIDATOR DEVICE

[75] Inventor: James M. Sorokes, Olean, N.Y.

[73] Assignee: Dresser Industries, Inc., Dallas, Tex.

[21] Appl. No.: 756,667

[22] Filed: Sep. 9, 1991

[51] Int. Cl.$^5$ .......................... G01B 1/00; G01B 5/03; G01B 5/20

[52] U.S. Cl. ...................... 33/530; 33/833; 33/503; 33/1 M

[58] Field of Search ............... 33/530, 644, 552, 553, 33/833, 503, 1 M

[56] References Cited

U.S. PATENT DOCUMENTS

| | | | |
|---|---|---|---|
| 1,696,525 | 12/1928 | Coolidge | 33/530 |
| 2,265,373 | 12/1941 | Johnson | 33/530 |
| 2,717,453 | 9/1955 | Wildt | 33/27.01 |
| 2,737,726 | 3/1956 | Christiansen | 33/530 |
| 3,380,170 | 4/1968 | Read | 33/530 |
| 4,266,345 | 5/1981 | Alice et al. | 33/1 M |
| 4,536,962 | 8/1985 | Hense et al. | 33/644 |
| 4,598,480 | 7/1986 | Cukelj | 33/833 |
| 4,653,011 | 3/1987 | Iwano | 33/503 |

Primary Examiner—William A. Cuchlinski, Jr.
Assistant Examiner—C. W. Fulton

[57] ABSTRACT

A device for measuring three-dimensional coordinate position of a blade to validate the position on an impeller having a main guide track with a mounting collar on one end with a secondary guide track securably received on the main guide track. The secondary guide track has an arm member that includes a vertically extending rod. The lower end of the rod is used to contact the coordinate points to be measured on the face of the blade. The X, Y, and Z coordinate measurements of each point along the face of the blade is read from scale indicia located along the main guide track, the secondary guide track and the rod extending down from the secondary guide track.

8 Claims, 3 Drawing Sheets

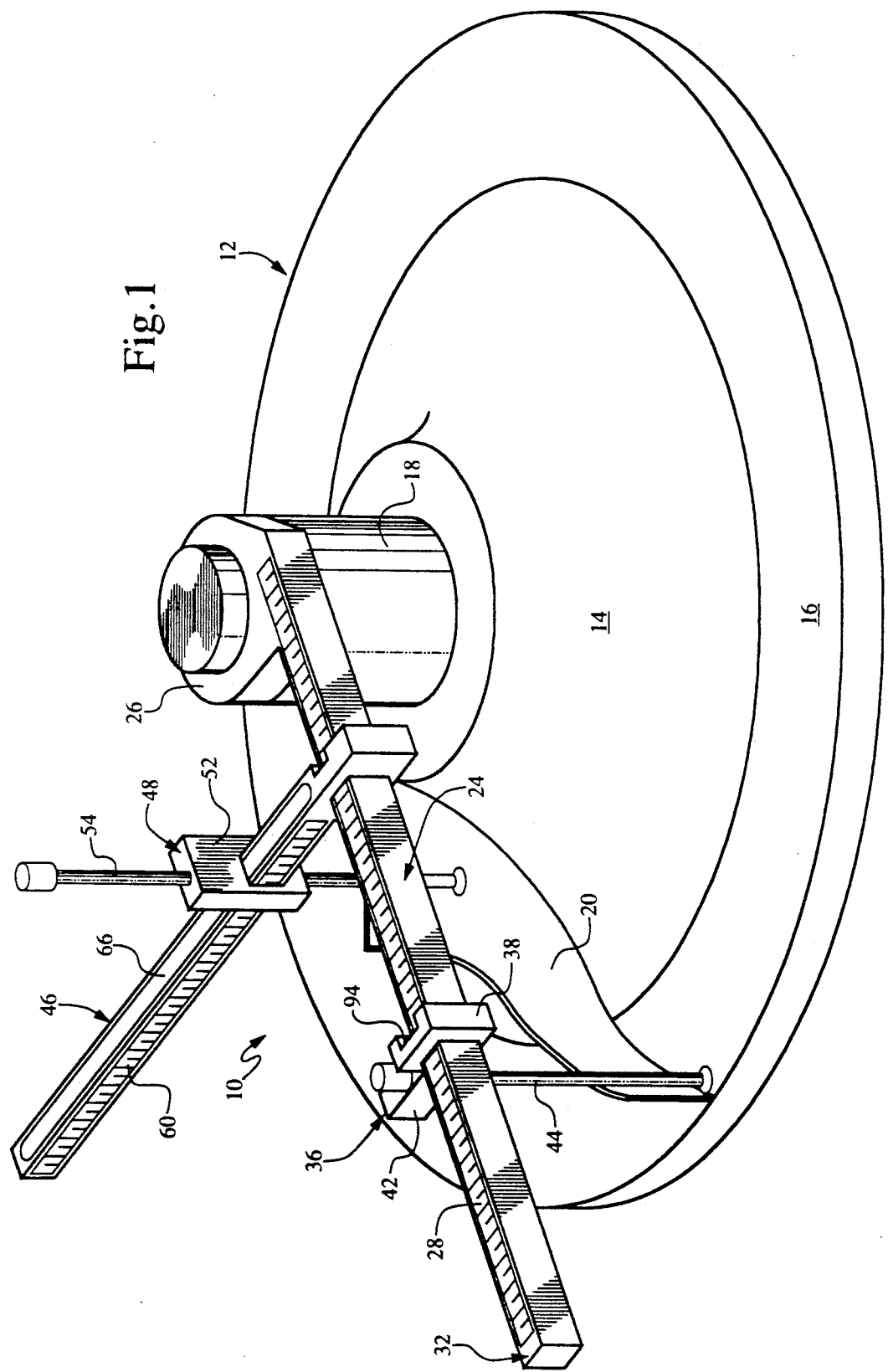

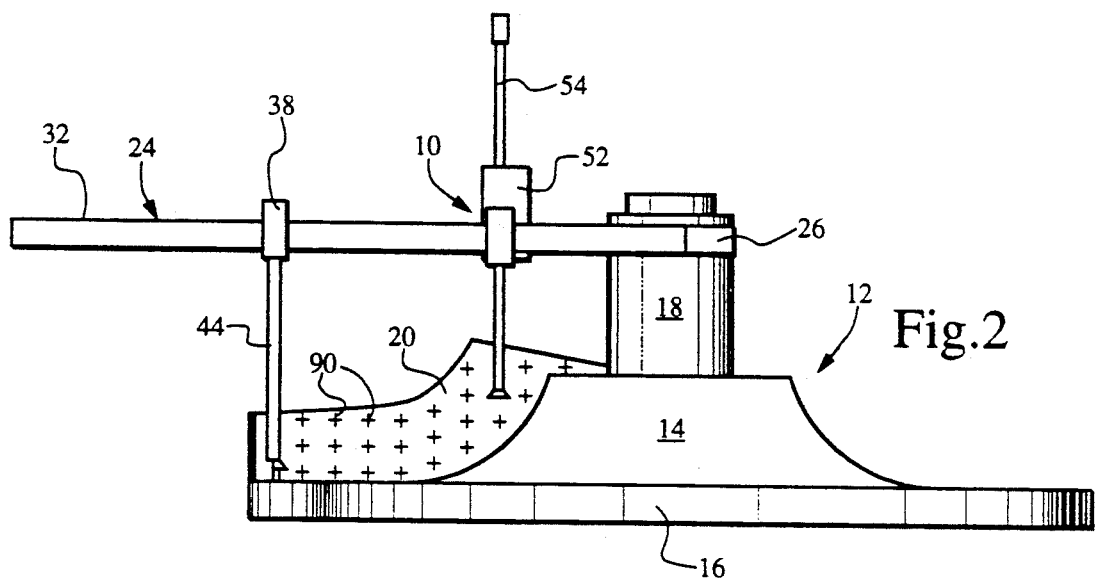
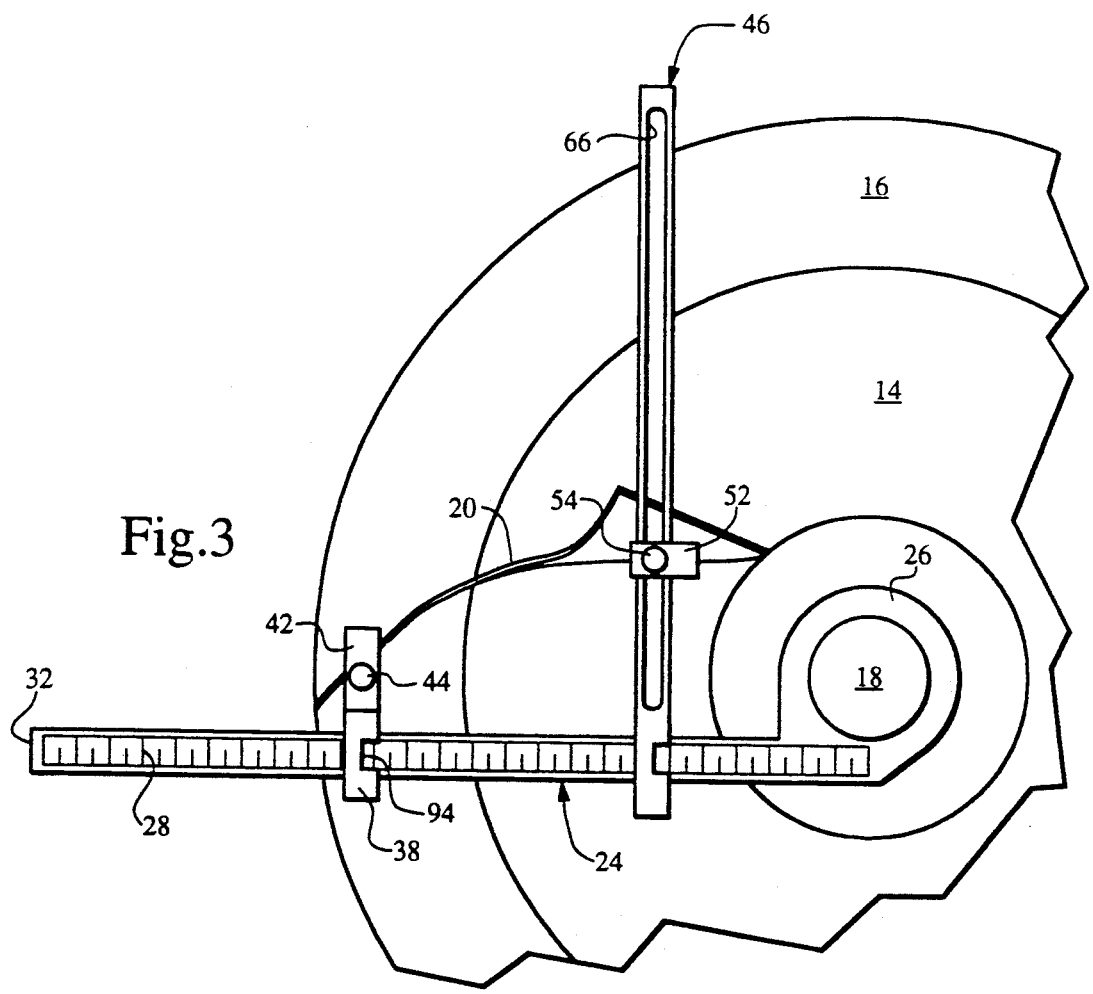

U.S. Patent  Oct. 6, 1992  Sheet 3 of 3  5,152,070
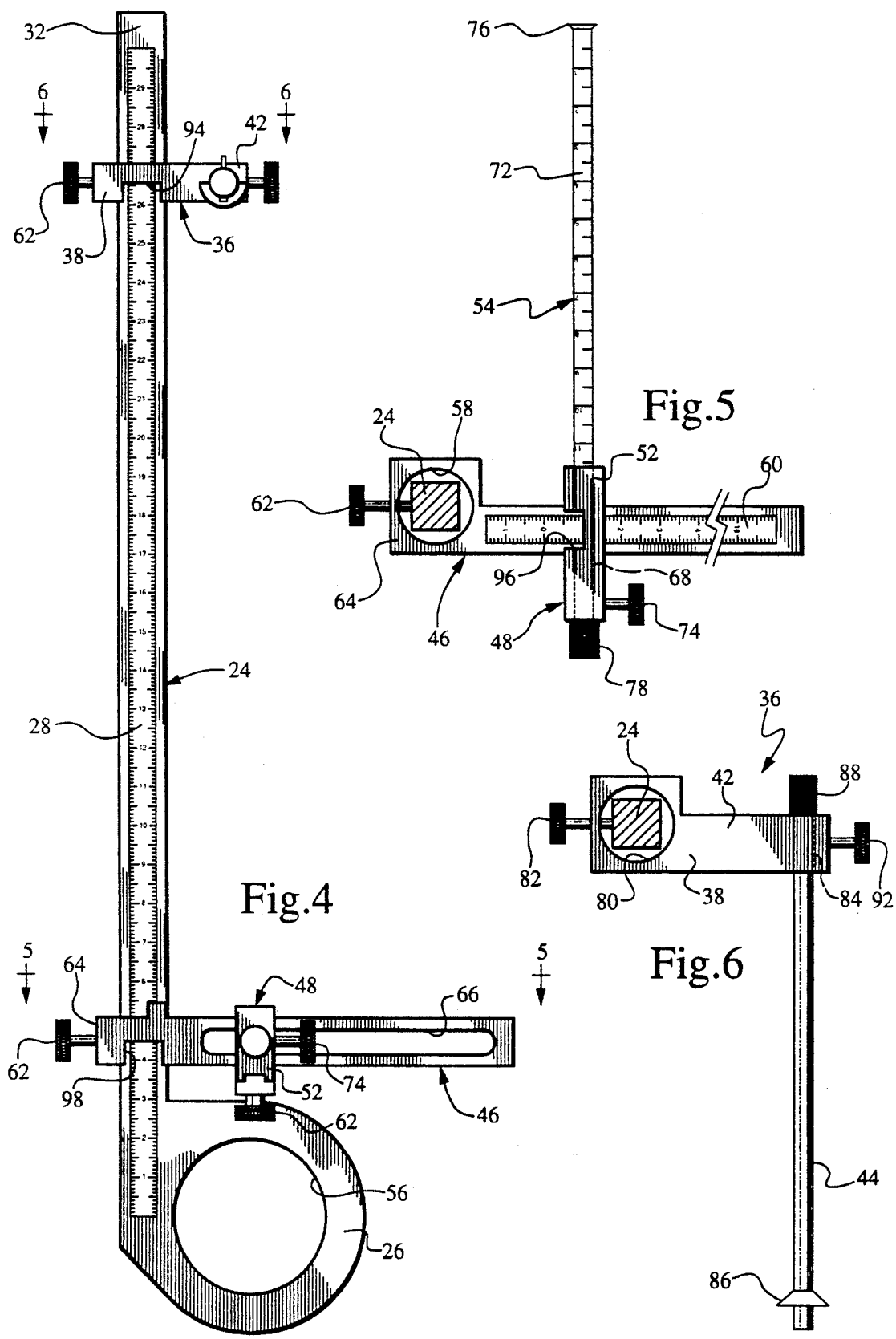

POSITION VALIDATOR DEVICE

FIELD OF INVENTION

This invention relates to a device for measuring the three-dimensional coordinate position of a part and more particularly to a position validator device for blade placement of an impeller.

BACKGROUND OF THE INVENTION

For a machine to properly perform at its designed peak, the machine must have all of its parts in proper position with respect to each other. In particular, for an impeller to provide a designed pressure rise at a designed flow rate, the blades of the impeller must be properly spaced and positioned. A device called a blade locator is used to properly position each blade on a tacking ring prior to welding to an impeller cover.

One method of validating the proper position of the blade, as well as the blade shape, is by having X, Y and Z coordinates measured on the surface of the blade by a sophisticated coordinate measuring machine. A minimum of 20 coordinate points are measured on the blade and compared against the design specification coordinate location information for that blade for a particular impeller.

This method requires a blade be affixed to the tacking ring by the blade locator and the tacking ring be removed from the blade locator device and moved into a "controlled" environment room housing the coordinate measuring machine. It takes approximately an hour to get the tacking ring located on the coordinate measuring machine, and another hour to measure the coordinates on the blade. If the measurements are within tolerance, the tacking ring is sent back to the shop environment to be mounted on the blade locator device to have the remaining blades tacked in position. If the coordinates are not acceptable, the tacking ring is still sent back to the shop environment, but the blades are removed and either rebent or repositioned or both. After this re-work is accomplished, the tacking ring is again sent to the "controlled" environment room housing the coordinate measuring machine for reinspection.

Sophisticated coordinate measuring machines are very expensive and require highly skilled, trained personnel to operate the measuring machine in a specially constructed "controlled" environment room.

SUMMARY OF THE INVENTION

In accordance with the present invention, the drawbacks of the prior method for validating the three-dimensional coordinate position of a blade are addressed by a position validator device that includes a main guide track having a scale indicia along one surface and a mounting collar on one end, and a secondary guide track having a scale indicia along one surface and securably receivable on the main guide track. An arm member having a vertically movable rod having scale indicia along its length, is securably received on the secondary guide track. The arm member, the rod, and secondary guide track can be secured to a fixed position, so that X, Y and Z coordinates can be read from the scale indicia along the main guide track, the secondary guide track and the rod. Accordingly, it is an object of this invention to provide a position validator device that can manually measure a number of three dimensional coordinates on a part to be positioned and validate the position of the part.

It is a feature of this invention to have a position validator device that can be mounted right on an apparatus that locates and sets the part in place so that coordinates can be measured on the part without moving the part to another specially prepared inspection area.

It is an advantage of this invention to have a position validator device that can be mounted right on the part locator device to reduce the time and expense to measure the necessary three dimensional coordinates of the part position.

It is an advantage of this invention to have a position validator device that is of relatively simple and economical design and manufacture.

It is another advantage of this invention to have an operator of the part locator device rather than a highly skilled technician take accurate measurements of the part position at the work station area.

Other objects, features and advantages of the invention will be apparent in the following description and claims in which the invention is described, together with the details to enable persons skilled in the art to practice the invention, all in connection with the best mode presently contemplated for the invention.

BRIEF DESCRIPTION OF THE DRAWINGS

Drawings accompanying the disclosure, and the various views thereof may be briefly described as:

FIG. 1 is a perspective view of a position validator device of the present invention mounted on a locator work station;

FIG. 2 is a side elevational view of the position validator device of the present invention mounted on the locator work station;

FIG. 3 is a partial top plan view of the position validator device of the present invention mounted on the locator work station;

FIG. 4 is a top plan view of the position validator device of the present invention;

FIG. 5 is a partial section view taken along lines 5—5 of FIG. 4; and

FIG. 6 is a section view taken along line 6—6 of FIG. 4.

DETAILED DESCRIPTION OF THE INVENTION

The preferred embodiment of the present invention is illustrated by way of examples in FIGS. 1-6. With specific reference to FIG. 1, a position validator device 10 is shown mounted on a blade locating work station 12 having a removable tacking ring 14 supported on a base table 16 with a centrally located post 18. This work station 12 is located in a shop environment and is controlled by an unskilled operator, who places and secures blade part 20 to the tacking ring 14.

The position validator device 10 is a portable unit that includes a main guide track 24 having on one end a mounting collar 26 securable to the center post 18. The main guide track 24 has scale indicia 28 along one side, preferably the top side 32. On the opposite end of the main guide track 24 is a main arm member 36 that is slideably mounted. The arm member 36 includes a block 38 having a horizontally extending shoulder 42 that carries a vertically oriented rod 44. Slideably coupled on the main guide track 24 is a secondary guide track 46 having a secondary arm member 48 that includes a secondary block 52 carrying a secondary rod 54. As shown in FIGS. 1 and 4, the secondary guide track 46 is at a right angle to and cantilevered from the main guide track 24.

As shown in detail in FIG. 4, the main guide track 24 is integral with the mounting collar 26 and has scale indicia 28 starting at zero from the center of an opening 56 in the mounting collar 26 which is the center of post 18. This main guide track 24, together with the main arm member 36, provides the measurement of one three-dimensional coordinate of the part, which is denoted as the Y-coordinate (radius). The secondary guide track 46 also provides the measurement of the Y-coordinate and is discussed in detail below.

As shown in detail in FIG. 5, the secondary guide track 46 has an opening 58 to receive the main guide track 24 and has scale indicia 60 along its side which starts at zero at the center of post 18. An adjacent locking screw 62 is threaded through a mounting end portion 64 of the secondary guide track 46 to engage a side of the main guide track 24 to fix the position of the secondary guide track 46 relative to the "O" position located at the center of post 18. This secondary guide track 46 measures a second three-dimensional coordinate of the part, which is denoted as the X-coordinate.

A slot 66 cut through the secondary guide track 46 is aligned with a throughbore 68 of the secondary block 52 to receive the secondary rod 54 having scale indicia 72 along its side. The vertical orientation of the secondary rod 54 with the scale indicia 72 provides a means for measuring a third three dimensional coordinate of the part, the Z-coordinate. A locking screw 74 through the secondary block 48 holds the secondary rod 54 in a fixed position to take the Z-coordinate measurement. The scale indicia 72 starts at zero from the edge of a flared out cap 76 located at the bottom of secondary rod 54 and measures zero at the top of the tacking ring 14. The top of the rod 54 has a knurled head 78 that prevents the rod 54 from falling through the throughbore 68.

The main arm member 36 shown in FIG. 6 has an opening 80 in the main block 38 for receiving the main guide track 24 and an adjacent locking screw 82 to hold the main block 38 in place on the main guide track 24. On the shoulder 42 of the main block 38 is a throughbore 84 for receiving the main rod 44. Preferably, the main rod 44 is cylindrical with a flared out cap 86 near its bottom portion and a knurled head 88 affixed to the top to prevent the main rod 44 from dropping through the throughbore 84. Adjacent this throughbore 84 is a locking screw 92 which locks and holds the main rod 44 in place.

This position validator device 10 is used to determined if a blade 20 has been properly positioned three-dimensionally for placement on a finished impeller. The initial step requires that a tacking ring 14 be affixed to a base table 16 wherein a blade locator device (not shown) positions a blade 20 on the tacking ring 14 on which a minimum of three tack welds are placed between the blade 20 and the tacking ring 14. The blade locator device may be removed or pushed to a different position so that the position validator device 10 may be mounted on the center post 18 and used to measure a series of three-dimensional coordinates 90 along the face of the blade 20 (see FIG. 2).

These measured coordinates are compared to the design coordinates of an impeller that provide the customer's desired pressure rise at a desired flow rate for various fluids. If the measured coordinates are within tolerance of the design coordinates, the position validator device 10 may be removed so that subsequent blades may be positioned and tacked. When all blades are tacked and positioned on the tacking ring 14, a cover (not shown) is placed over the positioned blades, wherein the blades are welded in a fixed position in the cover. The tack welds are removed between the blade 20 and the tacking ring 14 so that the tacking ring 14 may be reused. Preferably, several of the tacked blades are measured for comparison with the design coordinates.

In operation, the position validator device 10 is placed over the center post 18 of the base table 16. This eliminates the need of removing the tacking ring 14 from the work station 12 for measurements in a "controlled" environment by a sophisticated measurement machine. Instead, the machine operator moves the blade locator device out of the way and is capable of taking the desired three-dimensional measurements with the position validator device.

To measure the Y-coordinate radius of the blade, the main block 38 is moved to the end of the blade 20 so that the edge of the cap 86 touches the end of the blade. The Y-coordinate radius measurement is the number on the scaled indicia 28 on the main guide track 24 that is overlapped by a notch 94 on the main block 38 (See FIG. 4). The notch 94 is aligned with the centerline of and the point of contact on the flared out cap 86 to designate the measurement of the Y-coordinate radius of the blade 20.

To measure the X, Y and Z-coordinates of the coordinate points 90 on the face of the blade 20, the secondary guide track 46 has the secondary rod 54 with the flared out cap 76 make a point contact with the designated coordinate point 90 on the face of the blade 20. As shown in FIG. 5, a notch 96 on the secondary slide block 52 is aligned with the point contact made by the flared out cap 76 and is adjacent the scaled indicia 60 along the side of the secondary guide track 46. The number on the scaled indicia 60 that is overlapped by notch 96 is the X-coordinate measurement. On mounting end portion 64 of the secondary guide track 46 adjacent to opening 58 is a notch 98 that overlaps the scaled indicia 28 on the main guide track 24 to provide the Y-coordinate measurement. This notch 98 is aligned with the point contact of the cap 76 on the end of rod 54. The measurement for the Z-coordinate is provided by the scale indicia 72 along the side of the secondary rod 54 and revealed by the bottom of the block 52. The secondary guide track 46 is used to measure all X, Y and Z coordinates along the face of the blade 20.

The main slide block 36 is used to measure the radius of the blade from the center of the tacking ring. The required measurements are made along the face of the blade and written down by an operator to be compared with design coordinates of the particular impeller to be manufactured. If the first blade is within tolerance, subsequent blades may then be tacked on and possibly checked for position validation.

It is to be understood that the terminology as employed in the description and claims incorporated herein is used by way of description and not by way of limitation to facilitate understanding of the structure, function and operation of the combination of elements which constitute the present invention. Moreover, while the foregoing description and drawings illustrate in detail one successful working embodiment of the invention, to those skilled in the art to which the present invention relates, the present disclosure will suggest many modifications in construction, as well as widely differing embodiments and applications without thereby departing from the spirit and scope of the invention. The present invention, therefore is intended to be limited only by the scope of the appended claims and applicable prior art.

What we claim is:

1. A device for measuring three-dimensional coordinate position of a part comprising:
   a) a main guide track having a mounting collar on one end and scale indicia along one surface extending in a first dimensional direction;
   b) a second guide track having scaled indicia on one surface extending in a second dimensional direction securably receivable on said main guide track, wherein said secondary guide track longitudinally extends at a right angle to said main guide track;
   c) an arm member securably receivable on said secondary guide track, said arm member including a vertically movable rod having scale indicia extending in a third dimensional direction along its length, wherein said arm member is moved to the three-dimensional coordinate point to be measured and positioned so that the bottom of said rod is in contact with the coordinate point so that the three-dimensional coordinates X, Y, and Z can be read from said scale indicia on the main guide track, said scale indicia along the side of the second guide track and said scale indicia along the length of said vertical rod.

2. The device for measuring three-dimensional coordinate position of a part as set forth in claim 1 further comprises means for locking said secondary guide track and said arm member into a fixed position, so that a measurement can be accurately read from the scale indicia on said main guide track, said secondary guide track, and said rod.

3. The device for measuring three-dimensional coordinate position of a part as set forth in claim 1, wherein said rod includes a flared out cap on the bottom portion so that said edge of said cap makes a point contact with the coordinate point to be measured.

4. A device for measuring three-dimensional coordinate position of a part comprising:
   a) a main guide track having a mounting collar on one end and scale indicia along one surface;
   b) a secondary guide track having scaled indicia on one surface securably receivably on said main guide track, wherein said secondary guide track longitudinally extends at a right angle to said main guide track;
   c) an arm member securably receivable on said secondary guide track, said arm member including a vertically movable rod having scale indicia along its length, wherein said arm member is moved to the three-dimensional coordinate point to be measured and positioned so that the bottom of said rod is in contact with the coordinate point so that the three-dimensional coordinates X, Y, and Z can be read from scale indicia on the main guide track, said scale indicia along the side of the secondary guide track and said scale indicia along the length of said vertical rod, and
   a main arm member receivable on said main guide track having a vertically extending rod, wherein said main arm member is used to measure the radial measurement of the part.

5. A device removably connectable to a work table for measuring three-dimensional coordinate position of an impeller blade relative to a part at a blade locating work station on the table where the blade is affixed to the part, said device comprising:
   a) a main guide track having a mounting collar on one end for connection to the table and scale indicia along one surface;
   b) a secondary guide track having scaled indicia on one surface securably receivable on said main guide track, wherein said secondary guide track longitudinally extends at a right angle to said main guide track;
   c) an arm member securably receivable on said secondary guide track said arm member including a vertically movable rod having scale indicia along its length, wherein said arm member is moved to the three-dimensional coordinate point to be measured and positioned so that the bottom of said rod is in contact with the coordinate point so that the three-dimensional coordinates X, Y, and Z can be read from said scale indicia on the main guide track, said scale indicia along the side of the secondary guide track and said scale indicia along the length of said vertical rod.

6. The device for measuring three-dimensional coordinate position of a blade for an impeller as set forth in claim 5 further comprises means for locking said secondary guide track and said arm member into a fixed position, so that a measurement can be accurately read from the scale indicia on said main guide track, said secondary guide track, and said rod.

7. The device for measuring three-dimensional coordinate position of a blade for an impeller as set forth in claim 5, wherein said rod includes a flared out cap on the bottom portion so that said edge of said cap makes a point contact with the coordinate point to be measured.

8. A device for measuring three-dimensional coordinate position of a blade for an impeller, said device comprising:
   a) a main guide track having a mounting collar on one end and scale indicia along one surface;
   b) a secondary guide track having scaled indicia on one surface securably receivable on said main guide track, wherein said secondary guide track longitudinally extends at a right angle to said main guide track;
   c) an arm member securably receivable on said secondary guide track, said arm member including a vertically movable rod having scale indicia along its length, wherein said arm member is moved to the three-dimensional coordinate point to be measured and positioned so that the bottom of said rod is in contact with the coordinate point so that the three-dimensional coordinates X, Y, and Z can be read from said scale indicia on the main guide track, said scale indicia along the side of the secondary guide track and said scale indicia along the length of said vertical rod and,
   a main arm member receivable on said main guide track having a vertically extending rod, wherein said main arm member is used to measure the radial measurement of the part.

* * * * *